Figure 1:
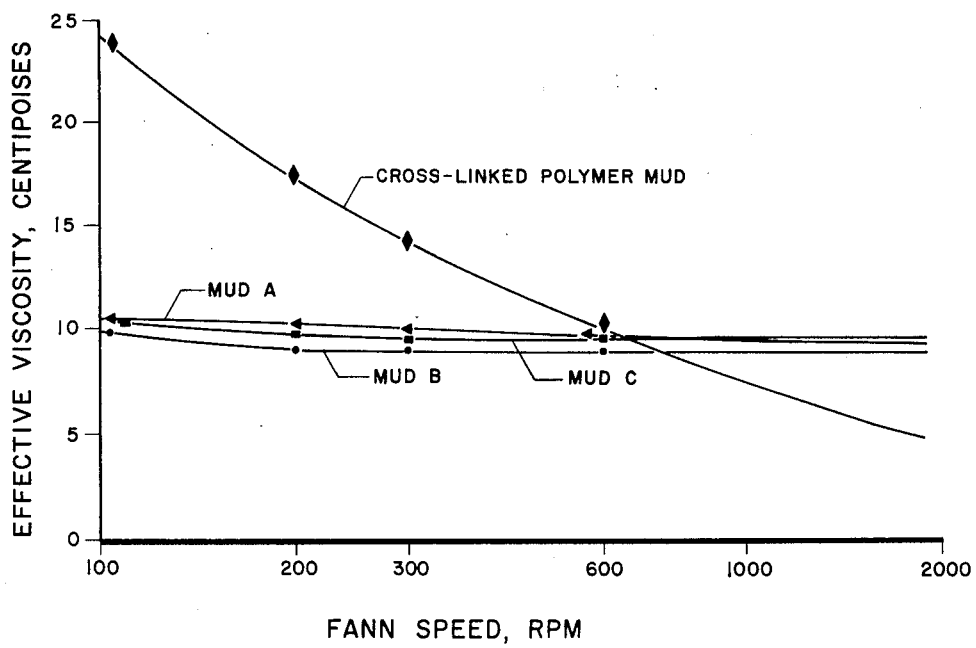

March 29, 1966  J. T. PATTON ETAL  3,243,000
METHOD AND COMPOSITION FOR DRILLING WELLS AND SIMILAR BOREHOLES
Filed June 23, 1965

WILLIS E. HOLMAN & INVENTORS
JOHN T. PATTON

BY James E. Reed
ATTORNEY

United States Patent Office 3,243,000
Patented Mar. 29, 1966

3,243,000
METHOD AND COMPOSITION FOR DRILLING
WELLS AND SIMILAR BOREHOLES
John T. Patton and Willis E. Holman, Houston, Tex., assignors to Esso Production Research Company, a corporation of Delaware
Filed June 23, 1965, Ser. No. 466,207
23 Claims. (Cl. 175—65)

This application is a continuation-in-part of Serial No. 289,415, filed on June 20, 1963.

The present invention relates to the drilling of oil wells, gas wells and similar boreholes and is particularly concerned with oilfield drilling operations in which viscous fluids are circulated in the wellbore.

The muds used in drilling oil wells, gas wells and similar boreholes are generally aqueous liquids containing clays or other colloidal materials in substantial quantities. These colloidal constituents contribute the viscosity and gel strength necessary for the entrainment and suspension of cuttings and weighting agents and assist in the formation of the filter cake needed for the reduction of fluid losses to the surrounding subsurface strata. It has been shown that excessive viscosity has an adverse effect on the penetration rates obtained and that substantially better rates can often be secured by eliminating the colloidal materials and using air, clear water or a similar fluid of low viscosity in place of ordinary mud. This is generally practical only in shallow wells where weighted fluids are not required, where the gel strength and fluid loss properties are not critical, and where no unusual hole conditions are apt to be encountered. Various mud formulations intended to permit the satisfactory entrainment and suspension of solids and to provide the required filter cake without adversely affecting the drilling rate have been suggested from time to time but have generally not been successful.

The present invention provides an improved method for drilling oil wells, gas wells and similar boreholes which alleviates the difficulty pointed out above. In accordance with the invention, it has now been found that drilling muds and similar fluids prepared with certain cross-linked polysaccharides are highly sensitive to shear and undergo a much more pronounced temporary loss in viscosity under the conditions prevailing adjacent the bit than do conventional fluids. This reversible reduction in viscosity permits the use of fluids sufficiently viscous to entrain and suspend solids and weighting agents in the borehole annulus and at the same time makes possible the use of fluids of relatively low viscosity in the vicinity of the bit. Much of the reduction in penetration rate encountered with conventional fluids can thus be avoided and hence substantial savings in overall drilling costs can generally be obtained.

Figure 2:
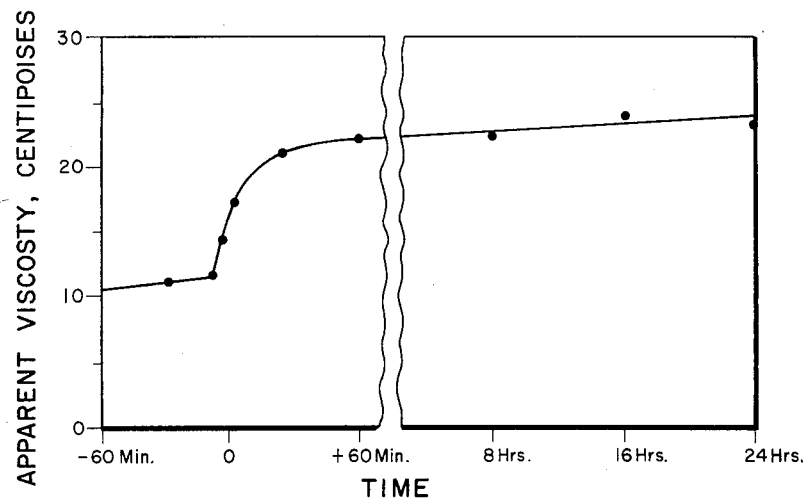

The nature and objects of the invention can best be understood by referring to the following detailed description and the accompanying drawing in which:

FIGURE 1 illustrates the relationship between viscosity and shear rate for the fluids of the invention and for conventional drilling muds; and FIGURE 2 shows the effect of variations in the cross-linking procedure on the final viscosities of the fluids of the invention.

The polysaccharides employed in preparing the fluids of the invention are heteropolysaccharides produced by the action of bacteria of the genus Xanthomonas on carbohydrates. Representative species of these bacteria which may be employed to produce the heteropolysaccharides include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum* and *Xanthomonas vesicatoria*. Studies have shown that the production of the heteropolysaccharides is a characteristic trait of members of the genus Xanthomonas but that certain species of the genus produce the polymers with particular efficiency. Species which are outstanding in this respect include *Xanthomonas begoniae, Xanthomonas campestris, Xanthomonas incanae* and *Xanthomonas pisi*. These species are therefore preferred for the synthesis of the heteropolysaccharides.

A variety of carbohydrates can be fermented with organisms of the genus Xanthomonas to produce the heteropolysaccharides used in preparing the drilling muds and similar fluids of the invention. Suitable carbohydrates include glucose, sucrose, fructose, maltose, lactose, galactose, soluble starch, corn starch, potato starch and the like. Experience has shown that carbohydrates employed need not be in a refined state and may instead be utilized as crude materials derived from natural sources. Specific examples of materials that may be employed include raw sugar, crude molasses, sugar beet juice, raw potato starch and the like. Crude materials of this type are generally much less expensive than the corresponding refined carbohydrates and are therefore normally preferred for use as substrates in the preparation of the heteropolysaccharides.

The fermentation of the carbohydrate to produce the heteropolysaccharide is generally carried out in an aqueous medium containing from about one to about five weight percent or more of the carbohydrate. The medium may include, in addition to the carbohydrate, from about 0.1 to about 0.5 weight percent of dipotassium acid phosphate and from about 0.1 to about 10 weight percent of distiller's solubles or a similar nutrient containing suitable trace elements and organic nitrogen sources. Many of the crude carbohydrates referred to above contain the trace elements and organic nitrogen sources in sufficient quantities to permit satisfactory fermentation and hence the addition of distiller's solubles or similar nutrient is not necessary in all cases. Excellent results have been obtained, for example, by fermenting raw sugar beet juice without the addition of a nutrient.

The fermentation reaction may be carried out in conventional equipment under aerobic conditions. The temperature is generally maintained between about 70° F. and 100° F. following inoculation of the medium with Xanthomonas organisms. As fermentation progresses, the viscosity of the medium increases rapidly due to the formation of the polysaccharide. The pH during fermentation is preferably maintained between about 6.0 and about 7.5 in order to secure maximum heteropolysaccharide yields. On completion of the reaction, generally after from about 12 to about 48 hours, the crude heteropolysaccharide can be recovered by drying the fermentate or by precipitating the polymer from solution. Suitable precipitating agents include methanol, ethanol, acetone, calcium hydroxide, magnesium hydroxide and the like. The precipitation procedures generally used result in the recovery of the polymer in the form of a potassium, sodium or similar salt rather than as the native heteropolysaccharide and may also lead to some deacetylation of the polymer molecule. The term "heteropolysaccharide" is employed herein to include these forms of the polymer as well as the native material. If desired, the polymer may be purified by filtering or centrifuging out the bacterial cells prior to precipitation of the polymer and thereafter repeatedly precipitating and washing the material to remove other impurities. This purification procedure is generally unnecessary in the preparation of heteropolysaccharides to be used in oilfield drilling muds and similar compositions and may therefore be omitted. The polymer is generally recovered as a thick viscous solution or a soft bulky powder having a dull yellow color. The preparation of the material is described in greater detail in U.S. Patent 3,020,206, issued on February 6, 1962.

The drilling muds and similar fluids of this invention are prepared by cross-linking the heteropolysaccharides in aqueous solution with polyvalent metal cations selected from Groups III through VIII of the Periodic Table. The cross-linking agents employed are preferably water-soluble trivalent chromium compounds such as chromium bromide, chromium chloride, chromium nitrate, basic chromium sulfate, chromium ammonium sulfate, chromium potassium sulfate, and the like. The reaction may, however, be carried out with other water-soluble compounds which yield polyvalent metal cations in aqueous solution, such as aluminum chloride, ferric chloride, manganese dichloride, magnesium aluminum silicate and the like, if desired. These latter materials are generally somewhat less effective than the water-soluble compounds of chromium referred to above but may nevertheless be used.

The reaction between the polyvalent cations and the heteropolysaccharide may be carried out by adding a water-soluble salt or other suitable compound yielding chromium or other polyvalent cations in aqueous solution to a solution containing the heteropolysaccharide. The concentrations in which the heteropolysaccharides are used generally range between about 0.001% and about 5% by weight, preferably between about 0.05% and about 3% by weight. Heteropolysaccharide concentrations in excess of 5% by weight may be employed in certain instances, particularly where lost circulation problems are encountered, but generally produce extremely viscous solutions which may be difficult to handle at low shear rates. The salts or other compounds yielding polyvalent cations in aqueous solution are normally utilized in concentrations between about 0.001% and about 1% by weight, preferably between about 0.05% and about 0.5%, based on the heteropolysaccharide solution. Higher concentrations of the cross-linking agents generally have no pronounced adverse effect on the reaction and may be utilized if desired.

The heteropolysaccharide is normally reacted with the polyvalent cations at ambient temperature and basic pH values. The reaction proceeds readily in either fresh water or brine and is normally accompanied by a pronounced increase in viscosity and the formation of a gel. It has been found that the extent to which the viscosity increases is determined in part by the amount of cross-linking agent employed, the pH of the solution, the order and time interval over which the constituents are added to the solution, and the method employed in mixing the constituents in solution. In general it is preferred to stir the heteropolysaccharide into water with sufficient agitation to form a homogeneous solution and allow this solution to stand for a period of two hours or more to assure complete hydration of the polymer. The cross-linking agent and sufficient sodium hydroxide or other base to raise the pH to a value above about 6.8, preferably between about 7.5 and about 11, are then added. Studies have shown that the pH required for most effective cross-linking varies with the different cross-linking agents and that in some cases an excessively high pH may cause precipitation of the polymer. In the case of the chromium cross-linking agents, the most effective pH range is generally between about 8.5 and 10.5.

The cross-linking agent employed in the reaction may be added with the base but is preferably incorporated into the solution before the base is added. It has been found that the order in which the constituents are incorporated affects the final viscosity of the cross-linked heteropolysaccharide solution. Delaying addition of the base normally results in a higher viscosity than can be obtained if the base and cross-linking agent are added simultaneously. Best results are therefore obtained by first adding the chromic salt or other cross-linking agent, allowing the solution to stand for a few minutes or longer, and then raising the pH by addition of the base. The base to be employed should normally be added slowly to avoid precipitating the cross-linking agent, particularly where chromium is used. After the base and cross-linking agent have been added, the solution is agitated to obtain uniform mixing of the constituents. The agitation rate should be controlled to avoid the introduction of excessive air into the solution and prevent undue shearing of the polymer molecules.

Solutions containing the cross-linked heteropolysaccharides prepared as described above may be employed as drilling muds and similar fluids without the addition of other materials. In most cases, however, a weighting agent such as barium carbonate, barium sulfate, amorphous silica or calcium carbonate and a preservative such as formaldehyde, paraformaldehyde, or a compound of mercury or arsenic will be included. The concentrations in which the weighting agents are used depend upon the mud density desired. The preservatives are normally employed in concentrations between about 0.001% and about 1%, based on the weights of the fluids in the system. In addition to the weighting agents and preservatives, muds and similar fluids containing the cross-linked heteropolysaccharides may contain other additives including gel forming materials such as bentonite and Attapulgus clay; fluid loss agents such as starch and carboxymethylcellulose; viscosity modifying agents such as sodium lignosulfonate, quebracho, and calcium lignosulfonate; calcium treating agents such as lime, calcium sulfate and calcium chloride; emulsifiers such as petroleum sulfonate, tall oil soap and sodium lignosulfonate; and mixing agents such as crude oil and diesel oil. It will be understood that not all of these constituents will normally be present in any one drilling mud or other fluid and that the amount of any particular material will be governed in part by the other constituents utilized and the service for which the composition is intended. In selecting such additives for use in a particular mud or other fluid, care should of course be taken to avoid materials which may have a detrimental effect upon the cross-linked polysaccharides.

The use of additives such as those referred to above in drilling muds and similar fluids containing the cross-linked heteropolysaccharides is dictated in part by the viscosity and fluid loss properties desired. Fluid loss is an inverse function of viscosity and can be reduced by adding more heteropolysaccharide to the cross-linked solution. In general, however, the heteropolysaccharides have only limited value as fluid loss control agents and in fresh water systems are less effective than carboxymethylcellulose. If extremely low fluid loss values are required in a fresh water system, it is therefore generally preferred to add carboxymethylcellulose in lieu of additional heteropolysaccharide. Low viscosity carboxymethylcellulose should be used if a reduction in fluid loss value without a substantial increase in viscosity is required. Starch can be added to improve the fluid loss value of both fresh water and salt water systems.

The fluid loss value of fresh water systems can also be improved by adding quebracho or lignite and sufficient sodium hydroxide to maintain a pH between about 8.5 and 9.0. Lignosulfonates can be used in a similar manner to further reduce fluid loss in nearly all environments. Oil, alone or in combination with lignosulfonates, lignites or quebracho, is highly effective. In most cases, small amounts of bentonite can also be added to fresh water systems to further improve fluid loss value.

The drilling muds and similar fluids of the invention are similar to other drilling fluids in that pilot tests should be run to determine the best material to be added for optimum results under the particular conditions existing. Certain combinations of materials are more effective for improving water loss, altering viscosity, changing flow properties and modifying gel strength than are others, particularly where contamination problems exist. If the water loss increases because of calcium or salt contamination, soda ash can be added to reduce the contamination and one or more of the additives referred to above can then be employed. Alternatively, the treating step can be omitted and the additives can be employed in somewhat higher concentrations. The additives selected will depend in part upon the particular procedure utilized and the problems which must be overcome.

The presence of calcium in high concentrations does not have any pronounced adverse effect on the cross-linked heteropolysaccharides under normal drilling conditions but will flocculate the drilled solids present. This in turn will increase the water loss. The same is true for salt contamination. If the pH exceeds about 11, however, and calcium is present in significant quantities, the heteropolysaccharide may precipitate. The pH should therefore be controlled.

As indicated above, the cross-linked polymers suitable for purposes of the invention can also be employed in emulsion-type drilling fluids. By adding the heteropolysaccharide and cross-linking agent to water, adding a base to effect cross-linking, and mixing the resultant solution with oil while providing intense agitation, a highly stable oil-water emulsion can be readily prepared. Such emulsions have the low fluid loss properties and other characteristics required in emulsion-type muds and similar fluids and have numerous advantages over fluids prepared in the conventional manner.

The invention is further illustrated by the following examples.

*Example 1*

In the first of a series of experiments, a heteropolysaccharide produced by the fermentation of sugar with *Xanthomonas campestris* organisms was cross-linked with trivalent chromium ions. The heteropolysaccharide, utilized in the form of a dry powder, was added to tap water in a concentration of 0.14% by weight. Chromic chloride, $CrCl_3 \cdot 6H_2O$, was added in a concentration equal to one-tenth that of the heteropolysaccharide. The solution was then rendered basic by the addition of 1 N sodium hydroxide and stirred vigorously at ambient temperature. Reaction of the chromium ions with the heteropolysaccharide proceeded rapidly in the aqueous solution, resulting in a pronounced increase in the viscosity of the solution, a marked increase in yield strength, and an increase in the yield point. On standing, the material formed a fragile gel. The gel was readily destroyed by shearing the solution but quickly reformed.

*Example 2*

The rheological properties of the muds and similar fluids of the invention are illustrated by the results of tests carried out with a solution containing one-half pound per barrel of a heteropolysaccharide produced by *Xanthomonas campestris* cross-linked with chromium chloride and three conventional drilling muds. All of the fluids had the same viscosities at 600 R.P.M. on the Fann V-G meter. The compositions of the three conventional muds were as follows:

| Mud A | Mud B | Mud C |
|---|---|---|
| 20 #/bbl. Wyoming bentonite. | 8 #/bbl. modified alkyl aryl sulfonate prehydrated. | 15 #/bbl. dry bentonite. |
| 5 #/bbl. ferrochrome lignosulfonate. | ½ #/bbl. caustic. | 4 #/bbl. chrome lignite. |
| ¼ #/bbl. caustic. | 15 #/bbl. prehydrated bentonite. | 20 #/bbl. sub-bentonite. |
| 5 #/bbl. gypsum. | | 8 #/bbl. chrome lignosulfonate. |
| | | 2 #/bbl. caustic. |

The viscosity of each of the fluids was measured with the Fann V-G meter and plotted. The curves obtained are shown in FIGURE 1 of the accompanying drawing. It will be noted that the cross-linked heteropolysaccharide solution underwent a marked reduction in apparent viscosity at high shear rates; whereas the viscosities of the conventional muds changed comparatively little. Even though the viscosity of the heteropolysaccharide solution was greater than that of all three bentonite muds at low shear rates, it became less than that of the conventional muds at high shear rates. This property of the cross-linked polymer solutions permits adequate suspension of solids in the annulus and yet facilitates penetration of the formation. The penetration rate is normally an inverse function of the apparent viscosity under high shear conditions and hence the cross-linked polymer solutions generally permit higher drilling rates than can be obtained with ordinary bentonite muds.

*Example 3*

Following the above tests, a series of cross-linked fluids were prepared by adding chromic chloride to samples of a solution containing a heteropolysaccharide produced by *Xanthomonas campestris* organisms. The heteropolysaccharide was present in the solution in a concentration of one pound per barrel. Chromic chloride was added to five of six samples in concentrations ranging from 0.10 to 0.90 pound per barrel. The resulting solutions were stirred at 5000 r.p.m. for five minutes and were then rendered alkaline by the addition of 1.6 milliliters of 1 N sodium hydroxide. Each sample was then again stirred at 5000 r.p.m. for five minutes. The samples were allowed to stand overnight in sealed bottles. Each was once more stirred at 5000 r.p.m. for five minutes and then transferred to a Fann viscosimeter for determination of the rheological properties. The apparent viscosities, plastic viscosities, yield points and power-law exponents were determined.

Apparent viscosity is defined as the viscosity of the fluid in centipoises measured at a shear rate of 1022 reciprocal seconds. The plastic viscosity is the difference between two times the apparent viscosity and the viscosity measured at 511 reciprocal seconds. For Newtonian fluids, the plastic viscosity and apparent viscosity are the same. For pseudoplastic liquids, on the other hand, the plastic viscosity is less than the apparent viscosity. The yield point is the theoretical force necessary to shear a fluid if it behaves as a Bingham plastic and is determined from the equation $YP = 2AV - 2PV$. The values are expressed in pounds per one hundred square feet. As pointed out earlier, the power-law exponent is a measure of pseudoplasticity.

The results obtained in the tests referred to above are set forth in the following table.

TABLE I

Effect of cross-linking agent on Polymer Solution Rheology

| Sample | CrCl₃·6H₂O Concentra- lbs./per bbl. | Apparent Viscosity, Av, cps. | Plastic Viscosity, PV, cps. | Yield Point, YP, lbs./100 Ft.² | Power-Law Exponent, n |
|---|---|---|---|---|---|
| A | 0.00 | 7.8 | 4.0 | 7.5 | 0.41 |
| B | 0.10 | 10.0 | 5.0 | 10.0 | 0.41 |
| C | 0.20 | 28.5 | 16.5 | 24.0 | 0.45 |
| D | 0.30 | 33.0 | 14.0 | 38.0 | 0.41 |
| E | 0.60 | 10.3 | 6.5 | 7.5 | 0.53 |
| F | 0.90 | 14.0 | 8.0 | 12.0 | 0.48 |

It will be noted from the above table that the samples to which the chromic chloride had been added had much higher apparent viscosities, plastic viscosities and yield points than did the control sample containing no chromic chloride. These values show that addition of the cross-linking agent increases the effectiveness of the heteropolysaccharide as a viscosity builder and thus permits its use in lower concentrations than would otherwise be required to obtain a given viscosity.

The power-law exponent values demonstrate that the cross-linked polymer solutions are pseudoplastic fluids. For Newtonian liquids, the exponent value is one and a straight line is obtained when shear stress in dynes per square centimeter is plotted against the shear rate in reciprocal seconds. The low exponents obtained with the cross-linked polymer solutions show that the solutions are highly pseudoplastic and thus have high apparent viscosities at low shear rates and low apparent viscosities at high shear rates. Under the low shear conditions existing in the borehole annulus, such fluids will possess the relatively high viscosities required for suspension of cuttings and weighting agents and proper control of fluid losses. Where the shear rates are high, the fluids will have relatively low viscosities and will therefore retard the penetration rate to a lesser extent than will conventional fluids, which are considerably less sensitive to shear rate. The power-law exponent values showed little change with increasing concentrations of the cross-linking agent, indicating that considerably lower viscosities can be obtained beneath the bit regardless of the viscosity employed in the annulus.

The data also show that the particular cross-linked heteropolysaccharide system tested had a maximum apparent viscosity at a chromic chloride concentration of 0.30 lbs./bbl. The apparent viscosity, plastic viscosity and yield point all decreased as the concentration of the cross-linking agent was increased to 0.6 lbs./bbl. and increased again with further increases in cross-linking agent concentration. This behavior is typical of the drilling fluids and similar compositions of the invention.

*Example 4*

Following the tests with chromic chloride described above, other chromium compounds were tested for use as cross-linking agents. The tests were carried out with samples of a solution containing a heteropolysaccharide produced by *Xanthomonas campestris* in a concentration of one pound per barrel. Each cross-linking agent was added to a separate sample of the polymer solution in an amount sufficient to provide 0.00975 lbs. of chromium metal per barrel of solution. Five minutes after addition of the chromium salts, each sample was adjusted to a pH of 10.9 by adding sodium hydroxide. The volume of base required was different in each case because each solution had a different neutralization equivalent. The final pH of each solution after standing overnight and the viscosities on the Fann viscosimeter at 300 and 600 revolutions per minute were determined. The results obtained are shown in Table II below.

TABLE II

Cross-linking of Heteropolysaccharide with Chromium Salts

| Chromium Salt | Final pH | Viscosity at 600 r.p.m. | Viscosity at 300 r.p.m. |
|---|---|---|---|
| Chromium chloride CrCl₃·6H₂O | 9.5 | 32.5 | 24.0 |
| Chromium nitrate Cr(NO₃)₃·9H₂O | 9.5 | 28.5 | 21.5 |
| Chromium potassium sulfate Cr₂(SO₄)₃·K₂SO₄·24H₂O | 9.6 | 33.0 | 23.5 |
| Basic chromium sulfate— sodium sulfate Cr(OH) SO₄·n Na₂SO₄ | 9.7 | 30.0 | 22.0 |

It can be seen by comparing the values in the above table with those for the uncross-linked polymer in Table I above that all of the salts employed cross-linked the heteropolysaccharide and produced high viscosity solutions. The chromium nitrate was somewhat less effective than the other compounds but can be employed if desired. These results demonstrate that it is the metal cations that are responsible for the cross-linking reaction and that any of a variety of different compounds may be used to supply the cations required.

*Example 5*

Additional tests similar to those described in the preceding paragraph were carried out using magnesium aluminum silicate and manganese dichloride as cross-linking agents. Both compounds were tested by adding them in concentrations of 0.1 lb./bbl. to separate solution containing 1 lb./bbl. of the *Xanthomonas campestris* heteropolysaccharide. Each sample was treated with caustic following addition of the cross-linking agent and the rheological properties of the resulting solutions were then determined. It was found that both salts cross-linked the heteropolysaccharide in aqueous solution. The apparent viscosities and other characteristics of the resulting solutions were similar to those obtained with the chromium cross-linking agents.

*Example 6*

Experiments similar to those described above were carried out with aluminum sulfate as the cross-linking agent. It was found that the aluminum ion readily reacted with the *Xanthomonas campestris* heteropolysaccharide in aqueous solution and that formation of the aluminum cross-linked polymer was accompanied by an increase in viscosity, gel strength and yield point similar to that noted earlier with the other cross-linking agents. Tests using various heteropolysaccharide-to-aluminum sulfate ratios showed that the rheological properties obtained with solutions containing the cross-linked materials can be controlled by varying the concentrations in which the reactants are employed.

*Example 7*

The effect of cross-linking the heteropolysaccharides is further demonstrated by the results of tests carried out with equivalent molar quantities of chromic chloride and calcium chloride. These tests involved the preparation of a base fluid by adding a heteropolysaccharide produced by *Xanthomonas campestris* to tap water in a concentration of one pound per barrel. Formaldehyde was added as a preservative in a concentration of one-half pound per barrel. This base fluid was divided into three parts. One portion was employed as the control. The second portion was modified by the addition of calcium chloride dihydrate, $CaCl_2.2H_2O$, in a concentration of 0.11 pound per barrel. Chromic chloride, $CrCl_3.6H_2O$, was added to the third portion in a concentration of 0.2 pound per barrel. All three portions were adjusted to a final pH of about 8 and the rheological properties were then measured. The results were as follows:

TABLE III
Effect of Cross-Linking Heteropolysaccharide

| Solution | Final pH | Apparent Viscosity, cps. | Plastic Viscosity, cps. | Yield Point, #/100 Ft.² | Gel Strength | |
|---|---|---|---|---|---|---|
| | | | | | Init. | 10 Min. |
| 1 #/bbl. heteropolysaccharide<br>½ #/bbl. HCHO | 8 | 8 | 4.5 | 7.0 | 2.0 | 2.3 |
| 1 #/bbl. heteropolysaccharide<br>½ #/bbl. HCHO<br>0.11 #/bbl. CaCl₂.2H₂O | 8 | 7.8 | 4.3 | 6.9 | 1.9 | 2.2 |
| 1 #/bbl. heteropolysaccharide<br>½ #/bbl. HCHO<br>0.2 #/bbl. CrCl₃.6H₂O | 8 | 30.8 | 16.7 | 28.2 | 11 | 17 |

It can be seen from the above table that the viscosities, yield point and gel strength of the sample containing the calcium chloride were substantially the same as those for the base solution. The solution to which the chromic chloride was added, on the other hand, had properties quite different from those of the two earlier samples. It is thus apparent that the calcium ions did not cross-link the heteropolysaccharide in aqueous solution to any perceptible extent. Similar results have been obtained with magnesium, sodium, potassium and other cations of light metals from Groups I and II of the Periodic Table. Salts of these metals will in some cases further increase the viscosities of very viscous solutions containing the heteropolysaccharides in high concentrations but, since this occurs with both monovalent and divalent cations, it is obviously due to a different phenomenon from that involved here.

*Example 8*

Further tests similar to those described above were carried out with sodium tetraborate, $Na_2B_4O_7.10H_2O$, to demonstrate that borate ions do not cross-link the heteropolysaccharides. These tests involved the addition of 0.1 pound per barrel of sodium tetraborate to a solution containing the heteropolysaccharide produced by *Xanthomonas campestris* in a concentration of 1 pound per barrel and ½ pound of formaldehyde as a preservative. It was found that no change in the apparent viscosity or other flow properties of the basic heterpolysaccharide solution occurred on addition of the sodium tetraborate and adjustment of the pH. Similarly negative results were obtained when the sodium tetraborate was used in a concentration of 0.2 pound per barrel. It is thus apparent that the cross-linking phenomenon depends upon the presence of polyvalent metal cations and that anions such as the borate ion are ineffective for cross-linking purposes.

*Example 9*

To demonstrate the effect of various additives on the fluid loss values of the muds and similar fluids of the invention, fluid loss measurements were made on a base mud and samples of the same mud containing the additives. The base mud was prepared by adding a heteropolysaccharide produced by the action of *Xanthomonas campestris* on glucose to tap water in a concentration of one-half pound per barrel, adding chromic chloride, $CrCl_3.6H_2O$, in a concentration of 0.1 pound per barrel, adjusting the pH to 8, incorporating formaldehyde in a concentration of one-half pound per barrel to serve as a preservative, and including 6 percent by volume of Springer shale to simulate cuttings. The fluid loss value of this mud, measured in accordance with the standard API procedure, was found to be 32 cc./30 minutes. The apparent viscosity was also determined. Six samples of the base mud were modified by the addition of high viscosity carboxymethyl cellulose, starch, the *Xanthomonas campestris* heteropolysaccharide, diesel oil, quebracho and ferrochrome lignosulfonate. The fluid loss values and viscosities of these samples were measured by the same procedures. The results are set forth in Table IV below.

TABLE IV
Effect of Additives on Fluid Loss Value

| Sample | Fluid Loss Value, cc./30 min. | Apparent Viscosity, cps. |
|---|---|---|
| Base mud | 32 | 9 |
| Base mud plus 1 #/bbl. of high viscosity carboxymethyl-cellulose | 7.5 | 22.4 |
| Base mud plus 1 #/bbl. of *Zanthomonas campestris* heteropolysaccharide | 12.5 | 25.5 |
| Base mud plus 1 #/bbl. of starch | 12.8 | 11.5 |
| Base mud plus 1 #/bbl. of quebracho | 26.5 | 9.0 |
| Base mud plus 1 #/bbl. of ferrochrome lignosulfonate | 23.6 | 8.5 |
| Base mud plus 3 vol. percent oil | 21.9 | 11.0 |

The data set forth in the above table show that the base mud had a relatively high fluid loss value and that the additives reduced this to more acceptable values. The carboxymethylcellulose gave a considerably lower fluid loss value than was obtained with any of the other materials but produced a substantial increase in viscosity. The *Xanthomonas campestris* heteropolysaccharide was inferior to the carboxymethylcellulose in that, in the same concentration, it produced less of a reduction in fluid loss value and gave an even greater increase in viscosity. The starch produced about the same fluid loss value as did the heteropolysaccharide and resulted in only a small increase in viscosity. The other materials reduced fluid loss value somewhat and also had little effect on viscosity. It will be apparent from these data that the use of such additives will permit a wide variation in the fluid loss values and viscosities of the fluids of the invention.

*Example 10*

An oil-in-water emulsion was prepared by adding 2% by volume of diesel oil to a sample of an aqueous solution containing a *Xanthomonas campestris* heteropolysaccharide cross-linked by the addition of chromium chloride. The oil was thoroughly dispersed within the solution to produce a milky white emulsion. This emulsion was set aside and examined at periodical intervals to determine the time required for separation of the oil and water phases. At the end of three weeks no perceptable separation had occurred. A variety of commercial demulsifying agents were then added to individual samples of the emulsion. None of these broke the emulsion. Emulsions prepared with diesel oil and aqueous solutions of the heteropolysaccharide in the absence of chromium ions, on the other hand, readily separated after standing for a few hours. It is thus apparent that the cross-linked heteropolysaccharides permit the preparation of highly stable emulsions. These materials can be employed for the preparation of emulsion type drilling muds and similar fluids to be used in the drilling of wells and similar boreholes.

*Example 11*

As pointed out earlier, the final viscosities of solutions containing the cross-linked heteropolysaccharide depend in part on the order in which the cross-linking agent and the base employed to adjust the pH are added. This is demonstrated by the results of tests wherein the base was added before, with, and after the cross-linking agent. These tests were carried out with samples of a standard solution containing the *Xanthomonas campestris* heteropolysaccharide in a concentration of one pound per barrel. A ten percent solution of chromic chloride hexahydrate was added to each sample in a concentration sufficient to provide 0.05 pound of the chromic chloride salt per barrel. The sodium hydroxide used was added to each sample as a 1 N solution in a quantity sufficient to provide 0.064 pound of dry solid caustic soda per barrel. The apparent viscosities of the solutions obtained when the base was added first, when the base and cross-linking agent were added simultaneously, and when the solution containing the cross-linking agent was allowed to stand before the base was added as shown in FIGURE 2 of the drawing. The values on the abscissa represent the time intervals between the addition of the chromic chloride and the addition of base to adjust the pH. It can be seen that little increase in apparent viscosity takes place if the base is added first and that best results are obtained by delaying addition of the base for an hour or more after the cross-linking agent is added. Changes in pH following the initial cross-linking reaction have a reversible effect on viscosity and hence the properties of a mud or similar fluid can be varied to some extent during use by simply changing the pH.

*Example 12*

The cross-linking reaction is also affected by the salts which are present in the water employed. It has been found that the reaction does not readily take place in distilled water but proceeds without difficulty in tap water containing small amounts of calcium, magnesium and similar constituents. This is shown by the results of tests in which a heteropolysaccharide produced by *Xanthomonas campestris* and chromic chloride were added to distilled water and to distilled water containing 100 parts per million of calcium as calcium carbonate. In each case one gram of the heteropolysaccharide was added to 350 milliliters of water, one-tenth of a gram of chromium chloride, $CrCl_3 \cdot 6H_2O$, was added, and the pH was then adjusted with sodium hydroxide. The fluid prepared with distilled water alone had an apparent viscosity of 8, a plastic viscosity of 4.5 and a yield point of 7. The pH was 8.0. The fluid prepared with distilled water containing 100 parts per million of calcium had an apparent viscosity of 20.75, a plastic viscosity of 12.5, and a yield point of 16.5. The pH of this second solution was 7.4. After the viscosities and yield points of the two solutions had been determined, calcium carbonate was added to the solution initially prepared with the distilled water. After stirring the solution and allowing it to stand, the properties were again measured. It was found that addition of the calcium raised the apparent viscosity from 8 to 21, increased the plastic viscosity from 4.5 to 12.5, and changed the yield point from 7 to 17.0. The pH following addition of the calcium carbonate was 8.0. As indicated earlier, these changes do not occur in the absence of a cross-linking agent such as chromic chloride.

It is apparent from the above results that the cross-linking reaction does not readily take place in the absence of calcium or similar ions. The water normally used in preparing drilling muds and similar fluids generally contains calcium and magnesium in quantities sufficient to promote cross-linking. If additional calcium or magnesium is added, care must be taken to avoid excessively high pH values. It can be shown that the presence of calcium in concentrations below about 40 parts per million has no perceptible effect on cross-linking and that the heteropolysaccharide will begin to precipitate as the calcium salt if calcium is present in quantities above about 3000 parts per million and the pH exceeds a value of about 11. Precipitation can be readily avoided in high calcium systems by proper control of the pH.

*Example 13*

A cross-linked polymer mud prepared in accordance with the invention was employed in a full scale drilling operation in order to fully demonstrate the advantages of the fluids of the invention. The well in which the mud was used had been drilled to a depth of about 5,737 feet with a mud containing water and native clays. At this point, the natural mud was displaced by an aqueous fluid containing a heteropolysaccharide produced by *Xanthomonas campestris* in a concentration of about one-half pound per barrel. Formaldehyde was used in a similar concentration to prevent fermentation. Chromic chloride solution was injected into this fluid at the suction line as it was pumped into the well. One hundred pounds of the chromic chloride were added over a two hour period to cross-link the polymer in 600 barrels of fluid. The properties of the cross-linked material were measured after the native mud had been completely displaced from the system and were as follows:

| | |
|---|---:|
| Mud weight, pounds per gallon | 9.1 |
| Funnel viscosity, seconds per quart | 31.5 |
| Apparanet viscosity, centipoises | 6.75 |
| Plastic viscosity, centipoises | 5.0 |
| Yield point, pounds per 100 square feet | 3.5 |
| Gel strength, pounds per 100 square feet | 1.5 |
| Water loss, cc. per 30 minutes | 24 |
| Filter cake, 32nds of an inch | 1 |
| pH, Beckman | 7.6 |

After the fluid containing the cross-linked polymer had thus been introduced into the system, the drilling operation was resumed without difficulty. Problems which had been encountered earlier with the native mud due to the heaving of shales and the accumulation of solids in the bottom of the hole during trips to the surface were not encountered. The fluid had excellent carrying capacity. Its stability was also good. There was no evidence of the loss of significant quantities of the polymer and hence, except where it became necessary to increase the viscosity above the initial value, only sufficient polymer and chromic chloride to compensate for dilution and for the increased volume of the system with increasing depth were added. The amount of makeup water necessary to maintain the mud system was considerably less than had been required with conventional muds at comparable depths in adjacent wells.

After the cross-linked fluid had been in use for several hours, the mud was converted to an emulsion type system by adding fifty barrels of crude oil. A very tight emulsion between the oil and cross-linked polymer fluid was formed rapidly. The viscosities and other properties of this emulsion were similar to those of the cross-linked fluid tested earlier. There were no signs of free oil in the mud pits or other evidence of breaking of the emulsion.

A comparison of the results obtained in this well after the total depth of 8,587 feet had been reached and in an adjacent well drilled with a fluid containing the same polymer without a cross-linking agent showed that the use of the chromic chloride had reduced the quantity of polymer required by about 50%. The amount of water necessary to maintain the fluid as drilling progressed was also considerably less in the well in which the cross-linking agent was used. The average bit life with the cross-linked fluid was 14.2 hours compared with 10.8 hours for adjacent wells drilled with conventional muds. The friction losses in the drill string were lower with the polymer fluid than with the conventional muds. It is thus apparent that the results obtained with the cross-linked heteropolysaccharide were significantly better than those obtained with conventional bentonite muds.

*Example 14*

The cross-linked polymer solutions are also useful for overcoming lost circulation. When the heteropolysaccharides and cross-linking agents are employed in very high concentrations, thick, viscous solutions can be formed. These solutions will set and form a rigid gel if kept quiescent for a period of about 15 minutes or longer. By incorporating a particulate solid such as cellophane, walnut hulls, mica, plastic particles, hardwood fibers or the like in such a high viscosity solution to impart strength and improve its bridging ability and injecting the resultant slurry into the well, fractures, vugs, honeycombed formations and similar lost circulation zones can be readily plugged. A typical formulation to be used for this purpose may contain about 5 lbs./bbl. of the *Xanthomonas campestris* heteropolysaccharide, about ½ lb./bbl. of chromic chloride or similar cross-linking agent, and sufficient sodium hydroxide or other base to provide a pH between about 7 and about 8. Tests have shown that drilling mud and similar fluids containing the cross-linked polymers can be converted into fluid suitable for lost circulation controlled by adding additional polymer and cross-linking agent, adjusting the pH to the desired level, and including the particulate or fibrous material to be used. After the highly viscous cross-linked solution has thus been employed, the properties required for drilling purposes can be restored by the addition of water, adjustment of the pH as necessary, and removal of the particulate solids with a desander. This obviates the necessity of completely replacing the drilling fluid in the system and greatly simplifies the solution of lost circulation problems.

*Example 15*

The cross-linking of the heteropolysaccharides for use in drilling muds and similar fluids is normally done in the field as described earlier. In some cases, however, it may be preferable to cross-link the heteropolysaccharide in aqueous solution at the point where the polymer is produced, recover the solids from the resultant viscous solution, and later reconstitute the cross-linked fluid by the addition of water at the well site. This avoids the necessity for carrying out the cross-linking reaction under field conditions and has other advantages. The feasibility of this procedure is demonstrated by the results of a test in which a heteropolysaccharide produced by the action of *Xanthomonas campestris* on sugar was added to tap water in a concentration of 0.14 percent by weight, chromic chloride hexahydrate was added in a concentration of 0.014 percent by weight, and cross-linking was effected by the addition of 1 N sodium hydroxide. The resultant cross-linked solution had an apparent viscosity and other properties similar to those of the cross-linked fluids referred to in the previous examples. The solid constituents of this solution were then recovered by adding three volumes of methanol and 1 percent sodium chloride. The cross-linked polymer slowly settled from solution, forming a thick gelatinous precipitate. This precipitate was filtered from the supernatant liquid and recovered. When redissolved in water, it formed a viscous solution having properties similar to those of the original fluid produced by cross-linking the heteropolysaccharide with chromic ions.

What is claimed is:

1. In an operation wherein an aqueous medium is injected into a borehole in the earth and contacted with a subterranean formation, the improvement which comprises incorporating into said aqueous medium a heteropolysaccharide produced by the action of bacteria of the genus Xanthomonas on a carbohydrate, cross-linking the heteropolysaccharide in said medium with sufficient polyvalent cations of a metal from Group III through VIII of the Periodic Table to increase the viscosity of said medium, and thereafter injecting said medium containing the cross-linked heteropolysaccharide into said borehole.

2. An operation as defined by claim 1 wherein said heteropolysaccharide is a heteropolysaccharide produced by *Xanthomonas campestris*.

3. An operation as defined by claim 1 wherein said polyvalent cations are chromium ions.

4. An operation as defined by claim 1 wherein said polyvalent cations are aluminum ions.

5. A method for drilling a borehole in the earth which comprises injecting into said borehole an aqueous medium containing a heteropolysaccharide produced by the action of bacteria of the genus Xanthomonas on a carbohydrate and sufficient polyvalent cations of a metal from Groups III through VIII of the Periodic Table to cross-link the heteropolysaccharide molecules and produce an increase in the viscosity of said medium, actuating a drill bit in contact with the formation adjacent said borehole in the presence of said aqueous medium, and withdrawing said medium and formation solids entrained therein from said borehole.

6. A method as defined by claim 5 wherein said polyvalent cations are trivalent chromium ions.

7. A method for preparing an aqueous fluid for use in wells and similar boreholes which comprises incorporating a heteropolysaccharide produced by bacteria of the genus Xanthomonas into an aqueous liquid, adding a water-soluble compound yielding polyvalent cations of a metal from Groups III through VIII of the Periodic Table in aqueous solution to said aqueous liquid in a concentration sufficient to permit the cross-linking of said heteropolysaccharide with said polyvalent cations, and thereafter adding sufficient base to said aqueous liquid to cross-link said heteropolysaccharide with said polyvalent cations and produce an increase in the apparent viscosity of said aqueous liquid.

8. A method as defined by claim 7 wherein said water-soluble compound is chromic chloride.

9. A method as defined by claim 7 wherein said water-soluble compound is magnesium aluminum silicate.

10. A method as defined by claim 7 wherein said water-soluble compound is basic chromium sulfate.

11. A method as defined by claim 7 wherein said heteropolysaccharide is incorporated in said liquid in a concentration between about 0.001% and about 5% by weight and said water-soluble compound is added in a concentration between about 0.001% and about 1% by weight.

12. A method as defined by claim 7 wherein sufficient base is added to raise the pH of said aqueous liquid to a value between about 7.5 and about 11.

13. In an oilfield operation wherein an aqueous liquid is injected into a borehole in the earth, the improvement which comprises adding to said aqueous liquid from about 0.001% to about 5% by weight of a heteropolysaccharide produced by the action of bacteria of the genus Xanthomonas on a carbohydrate and from about 0.001% to about 1% by weight of a water-soluble trivalent chromium compound, adding a base to said aqueous liquid in a quantity sufficient to raise the pH of said liquid to a value above about 6.8 and increase the viscosity of said liquid, and thereafter injecting said aqueous liquid into said borehole.

14. A method as defined by claim 13 wherein said heteropolysaccharide is a heteropolysaccharide produced by the action of *Xanthomonas campestris* on glucose.

15. A method as defined by claim 13 wherein from about 40 to about 3000 parts per million of calcium is added to said aqueous liquid in addition to said trivalent chromium compound.

16. An aqueous medium containing from about 0.001% to about 5% by weight of a heteropolysaccharide produced by the action of bacteria of the genus Xanthomonas on a carbohydrate and from about 0.001% to about 1% by weight of a water-soluble compound yielding polyvalent cations of a metal from Groups III through VIII of the Periodic Table, said medium having a pH in excess of about 6.8 and the heteropolysaccharide molecules contained therein being cross-linked by said polyvalent cations.

17. An aqueous medium as defined by claim 16 containing said heteropolysaccharide in a concentration between about 0.05% and about 3% by weight and said water-soluble compound in a concentration between about 0.005% and about 0.5% by weight.

18. An aqueous medium as defined by claim 16 wherein said water-soluble compound is a trivalent chromium salt.

19. An aqueous medium as defined by claim 16 wherein said water-soluble compound is an aluminum salt.

20. A method for drilling a borehole in the earth which comprises injecting into said borehole an aqueous medium containing from about 0.005% to about 3% by weight of a heteropolysaccharide produced by bacteria of the genus Xanthomonas on a carbohydrate and from about 0.005% to about 0.5% by weight of a water-soluble trivalent chromium compound, the heteropolysaccharide molecules being cross-linked in said medium by trivalent chromium cations, actuating a drill bit in contact with the formation adjacent said borehole in the presence of said aqueous medium, and withdrawing said medium and formation solids entrained therein from said borehole.

21. An aqueous medium as defined by claim 16 to which has been admixed sufficient oil to form an oil-in-water emulsion.

22. An aqueous medium as defined by claim 16 wherein said heteropolysaccharide is a heteropolysaccharide produced by *Xanthomonas campestris*.

23. An aqueous medium as defined by claim 16 wherein said water-soluble compound is a manganese salt.

References Cited by the Examiner

UNITED STATES PATENTS 3,054,689   9/1962   Jeanes et al. _____ 106—208

CHARLES E. O'CONNELL, *Primary Examiner.*

S. J. NOVOSAD, *Assistant Examiner.*